(12) United States Patent
Yang et al.

(10) Patent No.: US 9,001,727 B2
(45) Date of Patent: Apr. 7, 2015

(54) ARCHITECTURE AND METHOD OF RELAY NODE RF FOR CARRIER AGGREGATION

(75) Inventors: Yoon Oh Yang, Anyang-si (KR); Su Hwan Lim, Anyang-si (KR); Man Young Jung, Anyang-si (KR); Sang Wook Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 225 days.

(21) Appl. No.: 13/578,483

(22) PCT Filed: Nov. 1, 2010

(86) PCT No.: PCT/KR2010/007588
§ 371 (c)(1),
(2), (4) Date: Aug. 10, 2012

(87) PCT Pub. No.: WO2011/115347
PCT Pub. Date: Sep. 22, 2011

(65) Prior Publication Data
US 2012/0320818 A1    Dec. 20, 2012

Related U.S. Application Data

(60) Provisional application No. 61/314,585, filed on Mar. 17, 2010.

(30) Foreign Application Priority Data

Aug. 19, 2010    (KR) .......................... 10-2010-0080240

(51) Int. Cl.
H04B 7/14        (2006.01)
H04B 7/155       (2006.01)
H04L 5/00        (2006.01)

(52) U.S. Cl.
CPC ............ H04B 7/15542 (2013.01); H04L 5/001 (2013.01)

(58) Field of Classification Search
CPC ............................... H04W 16/10; Y02B 60/50
USPC ................. 370/230, 282, 315, 334, 492, 501; 455/7
See application file for complete search history.

(56) References Cited

U.S. PATENT DOCUMENTS

| | | | |
|---|---|---|---|
| 6,996,081 B1 * | 2/2006 | Brouwer ........................ | 370/335 |
| 7,092,714 B2 * | 8/2006 | Noll et al. ..................... | 455/446 |
| 8,576,753 B2 * | 11/2013 | Senarath et al. ............. | 370/279 |
| 2002/0187809 A1 * | 12/2002 | Mani et al. .................... | 455/561 |
| 2006/0293005 A1 * | 12/2006 | Hara et al. ................. | 455/127.4 |
| 2007/0066268 A1 * | 3/2007 | Simic et al. ................... | 455/318 |

(Continued)

*Primary Examiner* — Paul H Masur
*Assistant Examiner* — Michael Phillips
(74) *Attorney, Agent, or Firm* — Birch, Stewart, Kolasch & Birch, LLP

(57) ABSTRACT

A wireless communication system that includes a relay node is disclosed. The relay node supporting carrier aggregation (CA) comprises a first antenna for performing communication with a base station through a backhaul link; a plurality of backhaul link radio frequency (RF) chains connected with the first antenna, for transmitting and receiving a radio signal for backhaul link transmission; a second antenna for performing communication with a user equipment through an access link; a plurality of access link RF units connected with the second antenna, for transmitting and receiving a radio signal for access link transmission; and a control unit controlling the plurality of backhaul link RF chains and the plurality of access link RF chains to share at least a part of RF components between the backhaul link RF chains and the access link RF chains.

4 Claims, 17 Drawing Sheets

(56) References Cited

U.S. PATENT DOCUMENTS

| | | |
|---|---|---|
| 2008/0090575 A1 | 4/2008 | Barak et al. |
| 2008/0240054 A1 | 10/2008 | Sandhu et al. |
| 2008/0260388 A1* | 10/2008 | Kim et al. ............ 398/115 |
| 2009/0111401 A1* | 4/2009 | Itkin et al. ........... 455/127.3 |
| 2009/0122910 A1* | 5/2009 | Wen et al. ............ 375/295 |
| 2009/0149144 A1* | 6/2009 | Luz et al. ............. 455/216 |
| 2009/0170472 A1* | 7/2009 | Chapin et al. ........ 455/410 |
| 2010/0034135 A1 | 2/2010 | Kim et al. |
| 2011/0038284 A1* | 2/2011 | Senarath et al. ..... 370/279 |
| 2011/0103291 A1* | 5/2011 | Wiberg et al. ....... 370/315 |
| 2011/0269449 A1* | 11/2011 | Kazmi et al. ........ 455/422.1 |
| 2013/0121264 A1* | 5/2013 | Heo et al. ............ 370/329 |
| 2013/0153298 A1* | 6/2013 | Pietraski et al. ..... 175/45 |

* cited by examiner

Intra band contiguous carrier aggregation

Intra band non-contiguous carrier aggregation

Inter band non-contiguous carrier aggregation

ARCHITECTURE AND METHOD OF RELAY NODE RF FOR CARRIER AGGREGATION

CROSS REFERENCE TO RELATED APPLICATIONS

This application is the National Phase of PCT/KR2010/007588 filed on Nov. 1, 2010, which claims priority under 35 U.S.C. 119(e) to U.S. Provisional Application No. 61/314,585 filed on Mar. 17, 2010 and under 35 U.S.C. 119(a) to Patent Application No. 10-2010-0080240 filed in Republic of Korea on Aug. 19, 2010, all of which are hereby expressly incorporated by reference into the present application.

TECHNICAL FIELD

The present invention relates to a wireless communication system, and more particularly, to an architecture and method for a relay node RF for carrier aggregation.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier-frequency division multiple access (MC-FDMA) system.

DISCLOSURE OF INVENTION

Technical Problem

Accordingly, the present invention is directed to an architecture and method for a relay node RF for carrier aggregation, which substantially obviates one or more problems due to limitations and disadvantages of the related art.

An object of the present invention is to provide an apparatus for efficiently using power in a wireless communication system and a method for the same.

Another object of the present invention is to provide an architecture and method for a relay node RF for carrier aggregation, in which power can be used efficiently.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the invention, as embodied and broadly described herein, in one aspect of the present invention, a relay node supporting carrier aggregation (CA) comprises a first antenna for performing communication with a base station through a backhaul link; a plurality of backhaul link radio frequency (RF) chains connected with the first antenna, for transmitting and receiving a radio signal for backhaul link transmission; a second antenna for performing communication with a user equipment through an access link; a plurality of access link RF units connected with the second antenna, for transmitting and receiving a radio signal for access link transmission; and a control unit controlling the plurality of backhaul link RF chains and the plurality of access link RF chains to share at least a part of RF components between the backhaul link RF chains and the access link RF chains.

In this case, RF transmit chains for a plurality of component carriers (CCs) share a power amplifier (PA) for a backhaul link or an access link. Also, RF receive chains for a plurality of component carriers (CCs) share a lower noise amplifier (LNA) for the backhaul link or the access link.

In this case, RF transmit chains for a plurality of component carriers (CCs) are configured for each of the CCs, and a carrier frequency for the backhaul link and a carrier frequency for the access link are selectively applied to each of the RF transmit chains depending on time. In this case, the RF transmit chains configured for each of the CCs share a single PA. Also, RF receive chains for a plurality of component carriers (CCs) are configured for each of the CCs, and a carrier frequency for the backhaul link and a carrier frequency for the access link are selectively applied to each of the RF receive chains depending on time. In this case, the RF receive chains configured for each of the CCs share a single LNA.

Also, the RF transmit chains for a backhaul link of the first CC and the RF transmit chains for an access link of the second CC share a single PA.

Advantageous Effects of Invention

According to the embodiments of the present invention, power can be used efficiently in a wireless communication system. Preferably, an architecture and method for a relay node RF, which can efficiently use power, is provided.

It is to be understood that the advantages that can be obtained by the present invention are not limited to the aforementioned advantage and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Figure 1:
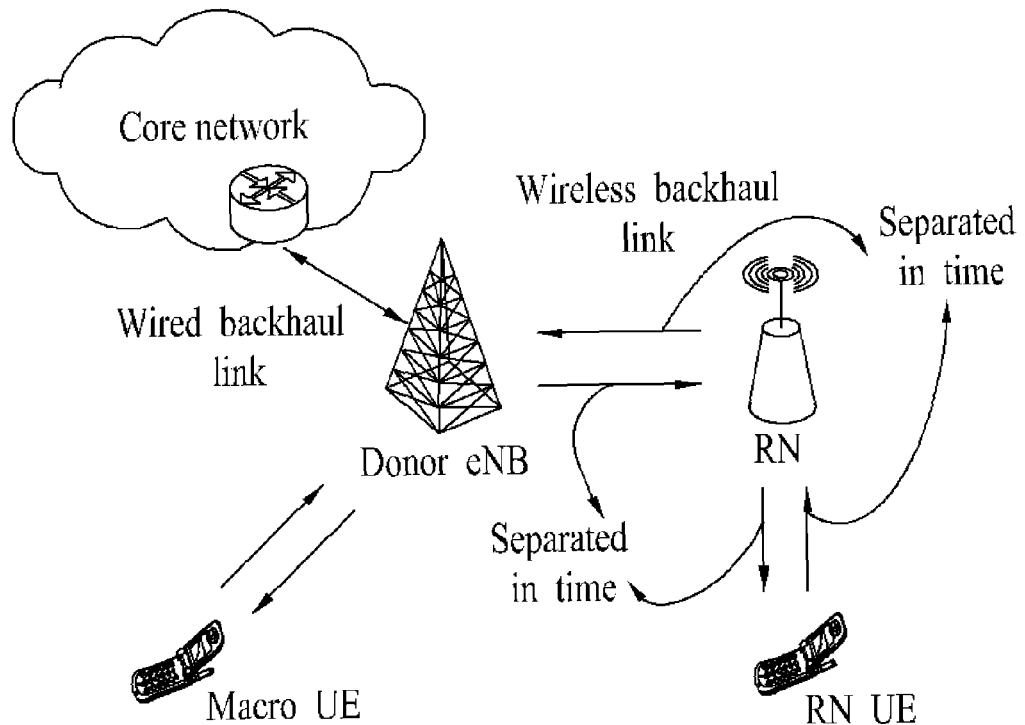
FIG. 1 and FIG. 2 are diagrams illustrating a wireless communication system that includes a relay node.

Hereinafter, structures, operations, and other features of the present invention will be understood readily by the preferred embodiments of the present invention, examples of which are illustrated in the accompanying drawings. The embodiments of the present invention can be used for various wireless access technologies such as CDMA, FDMA, TDMA, OFDMA, SC-FDMA, and MC-FDMA. The CDMA can be implemented by wireless technology such as universal terrestrial radio access (UTRA) or CDMA2000. The TDMA can be implemented by wireless technology such as global system for mobile communications (GSM)/general packet radio service (GPRS)/enhanced data rates for GSM evolution (EDGE). OFDMA can be implemented by wireless technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA. LTE-advanced (LTE-A) is an evolved version of the 3GPP LTE.

The following embodiments will be described based on that technical features of the present invention are applied to the 3GPP system. However, it is to be understood that the 3GPP system is only exemplary and the present invention is not limited to the 3GPP system.

In this specification, transmission power can be expressed as a linear scale or dB scale. Also, the operation according to the embodiment of the present invention can be performed in a power domain or an amplitude domain.

First of all, a network architecture of an Evolved Universal Mobile Telecommunications System (E-UMTS) will be described. The E-UMTS may be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

The E-UMTS includes a User Equipment (UE), base stations (eNode B and eNB), and an Access Gateway (AG) which is located at an end of a network (E-UTRAN) and connected to an external network. Generally, the base stations can simultaneously transmit multiple data streams for a broadcast service, a multicast service and/or a unicast service. One or more cells may exist for one base station. One cell is set to one of bandwidths of 1.25, 2.5, 5, 10, and 20 Mhz. Different cells may be set to provide different bandwidths. Also, one base station controls data transmission and reception for a plurality of user equipments. The base station transmits downlink (DL) scheduling information of downlink data to a corresponding user equipment to notify the corresponding user equipment of time and frequency domains to which data will be transmitted and information related to encoding, data size, hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, HARQ. A Core Network (CN) may include the AG and a network node for user registration of the UE. The AG manages mobility of a UE on a Tracking Area (TA) basis, wherein one TA includes a plurality of cells.

Figure 2:
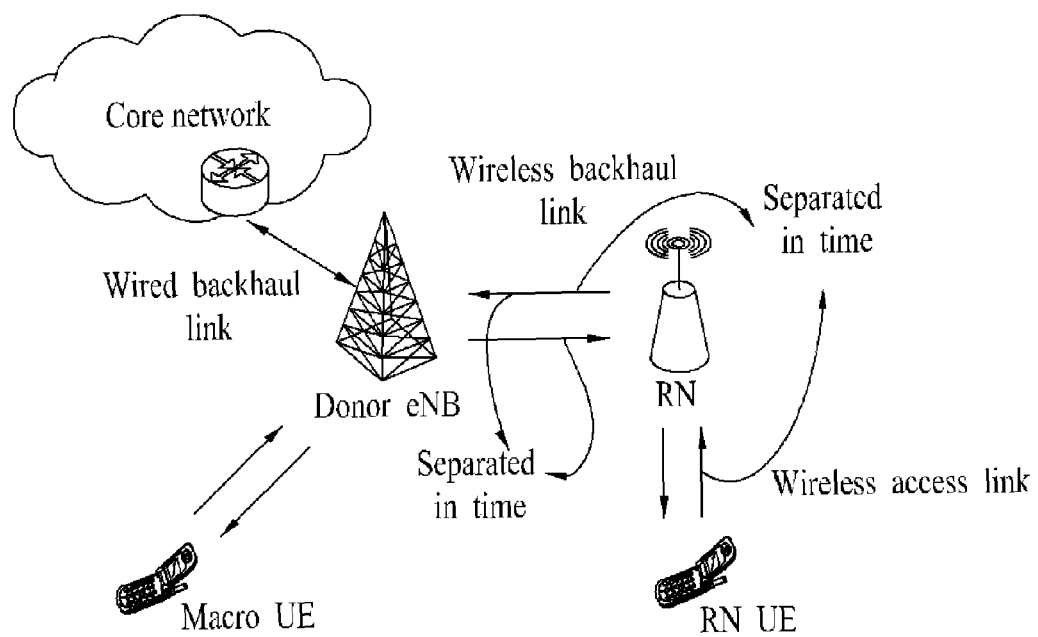

FIGS. 1 and 2 are diagrams illustrating a wireless communication system that includes a relay node. The relay node extends a service zone of the base station or is installed in a shaded zone to provide seamless services. Referring to FIG. 1 and FIG. 2, the wireless communication system includes a donor base station, a relay node, and a user equipment. The user equipment performs communication with the base station or the relay node. For convenience, the user equipment that performs communication with the base station will be referred to as a macro user equipment (UE), and the user equipment that performs communication with the relay node will be referred to as a relay user equipment. A communication link between the base station and the macro user equipment will be referred to as a macro access link, and a communication link between the base station and the relay user equipment will be referred to as a relay access link. Also, a communication link between the base station and the relay node will be referred to as a backhaul link. The relay node will be divided, as follows, depending on mobility.

Fixed relay node (RN): fixed permanently and used for enhancement of a shaded zone or cell coverage. It may function as a simple repeater.

Nomadic RN: installed temporarily when users increase, or movable randomly within buildings.

Mobile RN: built in public transportation means such as buses or subways, and should be supported with mobility.

Also, the relay node may be divided, as follows, depending on a link between the relay node and the network.

In-band connection: a network-to-relay link and a network-to-user equipment link share the same frequency band within a donor cell.

Out-band connection: a network-to-relay link and a network-to-user equipment link share their respective frequency band within a donor cell.

Also, the relay node may be divided, as follows, depending on whether the user equipment recognizes the relay node.

Transparent relay node: the user equipment cannot know whether communication with the network is performed through the relay node.

Non-transparent relay node: the user equipment knows that communication with the network is performed through the relay node.

In this specification, type 1 relay node (Type1 RN) means a relay node that uses the same carrier frequency for the backhaul link and the access link. In case of Type1 RN, backhaul uplink carrier frequency $f_{UL\_BH}$ is the same as access uplink carrier frequency $f_{UL\_AC}$ (that is, $f_{UL\_BH}=f_{UL\_AC}=f^{UL}$), and backhaul downlink carrier frequency $f_{DL\_BH}$ is the same as access downlink carrier frequency $f_{DL\_AC}$ (that is, $f_{DL\_BH}=f_{DL\_AC}=f_{DL}$). In this case, the uplink carrier frequency is different from the downlink carrier frequency, the backhaul link and the access link are operated respectively in accordance with a Frequency Division Duplex (FDD) mode. In the mean time, in case of the Type1 RN, it is discussed that the uplink carrier frequency is used as the backhaul downlink carrier frequency (that is, $f_{DL\_BH}=f_{UL}$). In this case, the backhaul uplink carrier frequency is the same as the backhaul downlink carrier frequency, the backhaul link is operated in accordance with a Time Division Duplex (TDD) mode.

FIG. 1 illustrates that the backhaul link and the access link are all operated in accordance with the FDD mode. In more detail, the carrier frequency of the backhaul link and the carrier frequency of the access link are in the following correlation. For convenience, the relay node illustrated in FIG. 1 will be referred to as A type relay node.

Backhaul link: $f_{UL\_BH}=f_{UL}$, $f_{DL\_BH}=f_{DL}$=>FDD backhaul
Access link: $f_{UL\_AC}=f_{UL}$, $f_{DL\_AC}=f_{DL}$=>FDD access FIG. 2 illustrates that the backhaul link is operated in accordance with the TDD mode and the access link is operated in accordance with the FDD mode. In more detail, the carrier frequency of the backhaul link and the carrier frequency of the access link are in the following correlation. For convenience, the relay node illustrated in FIG. 2 will be referred to as B type relay node.

Figure 3:
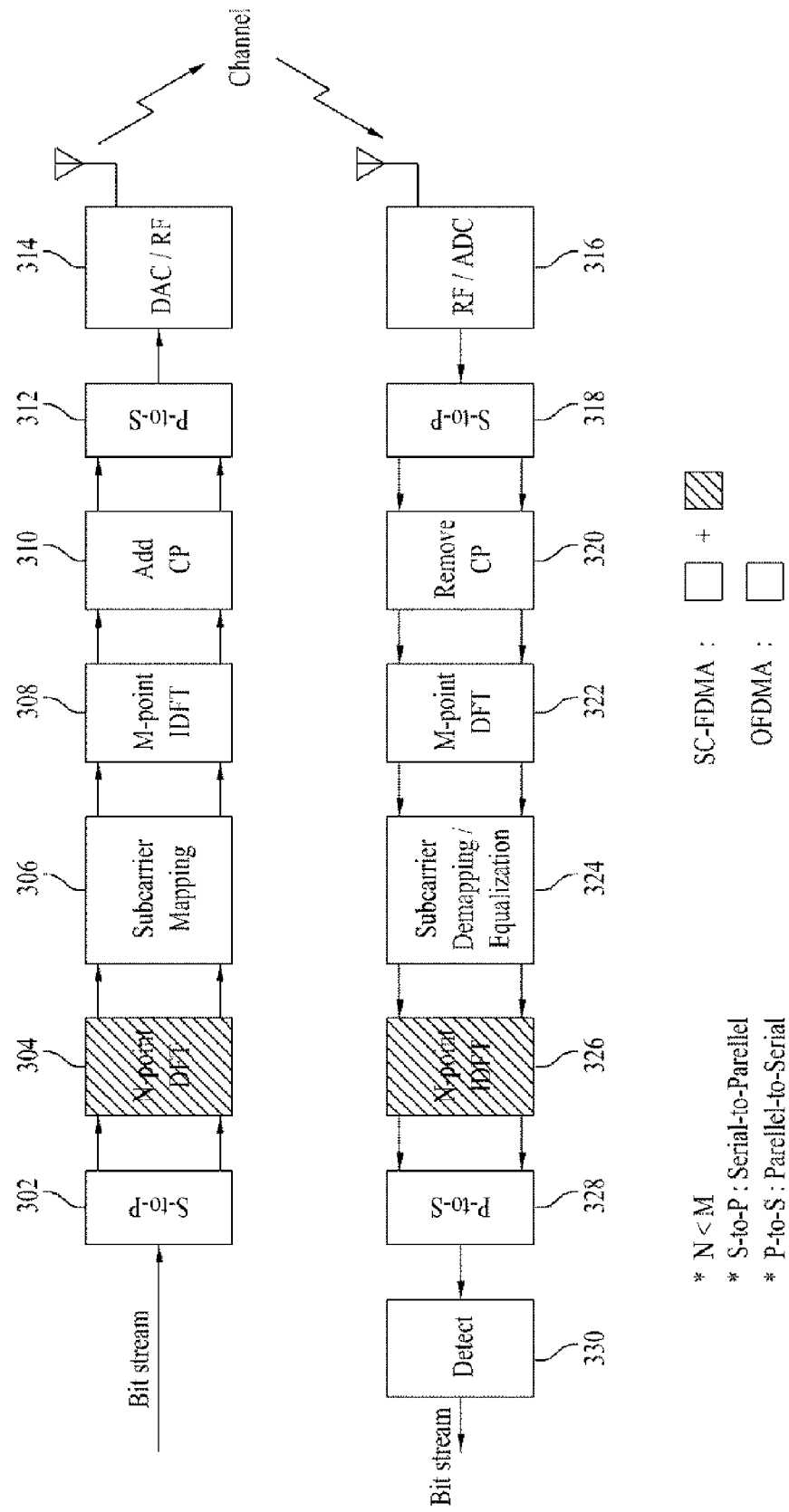
FIG. 3 is a block diagram illustrating a transmitter and a receiver for OFDMA and SC-FDMA.

Backhaul link: $f_{UL\_BH}=f_{UL}$, $f_{DL\_BH}=f_{UL}$=>TDD backhaul
Access link: $f_{UL\_AC}=f_{UL}$, $f_{DL\_AC}=f_{DL}$=>FDD access FIG. 3 is a block diagram illustrating a transmitter and a receiver for OFDMA and SC-FDMA. In the uplink, transmitters 302 to 314 are parts of the user equipment, and receivers 316 to 330 are parts of the base station. In the downlink, the transmitters are parts of the base station, and the receivers are parts of the user equipment.

Referring to FIG. 3, an OFDMA transmitter includes a serial to parallel converter 302, a sub-carrier mapping module 306, an M-point inverse discrete fourier transform (IDFT) module 308, a cyclic prefix (CP) addition module 310, a parallel to serial converter 312, and a radio frequency (RF)/digital to analog converter (DAC) module 314.

A signal processing procedure in the OFDMA transmitter will be described below. First of all, bit streams are modulated to data symbol sequences. The bit streams correspond to codewords or transport blocks. The data symbol sequences in series are converted to parallel data symbol sequences as much as N (302). N number of data symbols are mapped with N number of subcarriers allocated among a total of M number of subcarriers, and the other M-N number of carriers are padded with 0 (306). The data symbols mapped in a frequency domain are converted to time domain sequences through M-point IDFT processing (308). Afterwards, in order to reduce inter-symbol interference (ISI) and inter-carrier interference (ICI), cyclic prefix is added to the time domain sequences to generate OFDMA symbols (310). The generated OFDMA symbols are converted from parallel symbols to serial symbols (312). Then, the OFDMA symbols are transmitted to the receiver through digital-to-analog conversion and frequency uplink conversion (314). On the other hand, the OFDMA receiver includes an RF/ADC (analog to digital converter) module 316, a serial-to-parallel converter 318, a cyclic prefix removing module 320, a discrete fourier transform (DFT) module 322, a subcarrier demapping/equalization module 324, a parallel-to-digital converter 328, and a detection module 330. A signal processing procedure of the OFDMA receiver will be configured in reverse order of the OFDMA transmitter.

As compared with the OFDMA transmitter, the SC-FDMA transmitter additionally includes an N-point DFT module 304 prior to the subcarrier mapping module 306. The SC-FDMA transmitter can reduce a peak-to-average power ratio (PAPR) of a transmitting signal more remarkably than the OFDMA transmitter by spreading a plurality of data to the frequency domain through DFT prior to IDFT processing. Also, as compared with the OFDMA receiver, the SC-FDMA receiver additionally includes an N-point IDFT module 326 after the subcarrier demapping module 324. A signal processing procedure of the SC-FDMA receiver will be configured in reverse order of the SC-FDMA transmitter.

Figure 4:
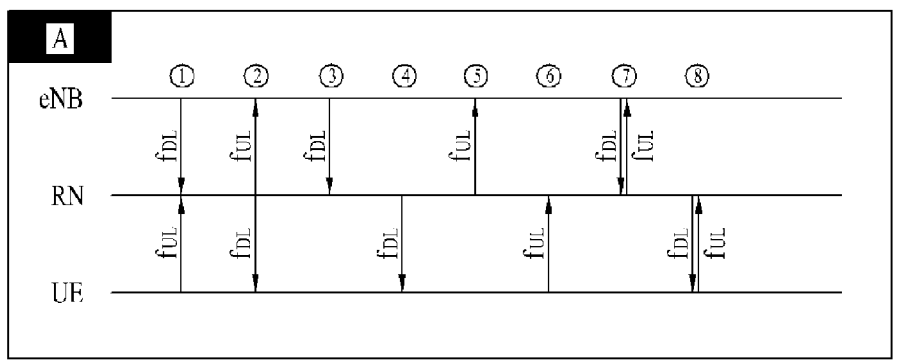
FIG. 4 and FIG. 5 are diagrams illustrating various transmission scenarios where a relay node transmits a signal through a backhaul link and an access link.
Figure 5:
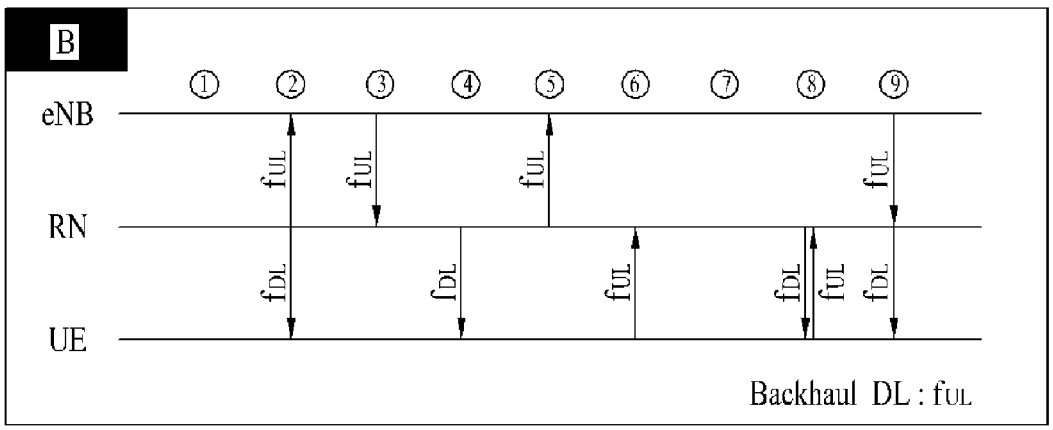

FIG. 4 and FIG. 5 are diagrams illustrating various transmission scenarios where a relay node transmits a signal through a backhaul link and an access link. FIG. 4 illustrates A type relay node, wherein the relay node is operated in accordance with the FDD mode in both the backhaul link and the access link. FIG. 5 illustrates B type relay node, wherein the relay node is operated in accordance with the TDD mode in the backhaul link while it is operated in accordance with the FDD mode in the access link. Referring to FIG. 4 and FIG. 5, available transmission scenarios are as follows.

Scenario ①: base station→relay node transmission in the backhaul link and user equipment→relay node transmission in the access link are performed at the same time. In other words, the relay node receives signals from the base station and the user equipment at the same time.

Scenario ②: relay node→base station transmission in the backhaul link and relay node→user equipment transmission in the access link are performed at the same time. In other words, the relay node transmits signals to the base station and the user equipment at the same time.

Scenario ③: base station→relay node transmission in the backhaul link is performed. In other words, downlink transmission is only performed in the backhaul link.

Scenario ④: relay node→user equipment transmission in the access link is performed. In other words, downlink transmission is only performed in the access link.

Scenario ⑤: relay node→base station transmission in the backhaul link is performed. In other words, uplink transmission is only performed in the backhaul link.

Scenario ⑥: user equipment→relay node transmission in the access link is performed. In other words, uplink transmission is only performed in the access link.

Scenario ⑦: base station→relay node transmission and relay node→base station transmission in the access link are performed in the backhaul link at the same time. In case of B type relay node (FIG. 5), since the relay node is operated in the backhaul link in accordance with the TDD mode, it cannot perform communication with the base station in accordance with a full duplex mode at a random time.

Scenario ⑧: relay node→user equipment transmission and user equipment→relay node transmission in the access link are performed at the same time.

Scenario ⑨: base station→relay node transmission in the backhaul link and relay node→user equipment transmission in the access link are performed at the same time. In other words, the relay node receives a signal from the base station and transmits a signal to the user equipment.

Figure 6:
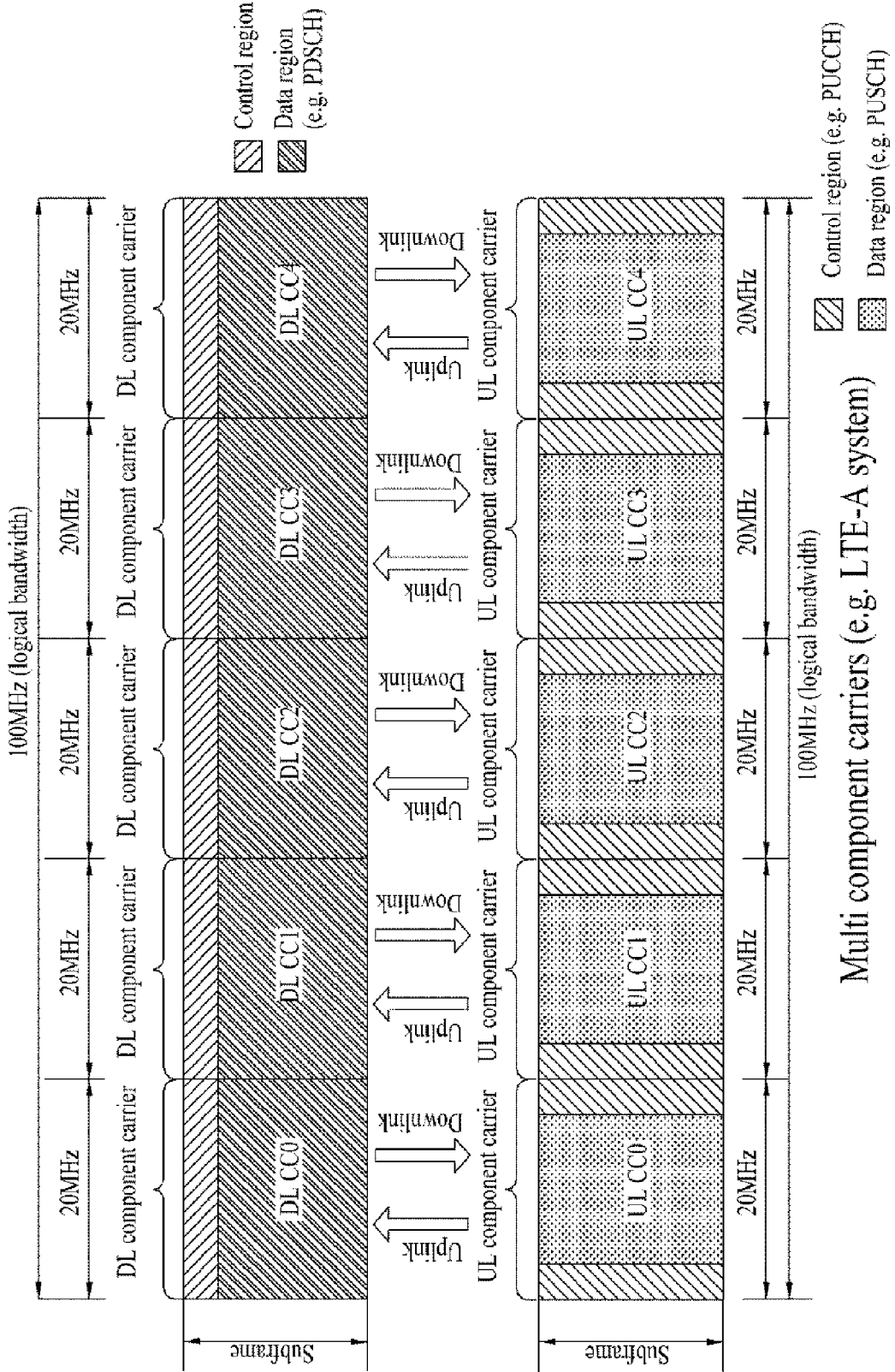
FIG. 6 is a diagram illustrating an example of communication using multiple component carriers (CC) under the carrier aggregation (CA) status.

FIG. 6 is a diagram illustrating an example of communication using multiple component carriers (CC) under the carrier aggregation (CA) status. FIG. 6 corresponds to a communication example in the LTE-A system. The LTE-A system uses carrier aggregation or bandwidth aggregation where a plurality of uplink/downlink frequency blocks are collected to use broader frequency bandwidths, thereby using greater uplink/downlink bandwidths. Each frequency block is transmitted using a component carrier (CC). The CC may mean a frequency block for carrier aggregation or a center carrier of a frequency block depending on the context, wherein the frequency block and the center carrier are used together.

Referring to FIG. 6, five component carriers (CCs) of 20 MHz are collected in the uplink/downlink to support a bandwidth of 100 MHz. The respective CCs may adjoin each other in the frequency domain or not. For convenience, FIG. 6 illustrates that a bandwidth of each UL CC is the same as and symmetrical to that of each DL CC. However, the bandwidths of the respective component carriers may be defined independently. Also, asymmetrical carrier aggregation where the number of uplink component carriers is different from the number of downlink component carriers may be configured. The asymmetrical carrier aggregation may occur due to a limit of available frequency bandwidth, or may be configured artificially by network configuration. Also, although an uplink signal and a downlink signal are transmitted through CCs mapped with each other one to one, CC through which a signal is actually transmitted may be varied depending on network configuration or signal type. For example, CC through which a scheduling command is transmitted may be different from CC through which data are transmitted in accordance with a scheduling command. Also, uplink/downlink control information can be transmitted through a specific UL/DL CC regardless of mapping between CCs. In the mean time, even though N number of CCs are configured in the entire system band, a frequency band that can be received by a specific user equipment can be limited to M(<N) number of CCs.

Intra-band contiguous aggregation and intra-band non-contiguous aggregation and inter-band non-contiguous aggregation can be used depending on a type of carrier aggregation (CA). An E-UTRA operating band of Table 1 can be used for carrier aggregation, but it is to be understood that carrier aggregation is not limited to such an E-UTRA operating band of Table 1.

TABLE 1

| E-UTRAOperating Band | Uplink(UL) operating bandBS receiveUE transmit $F_{UL\_low}$-$F_{UL\_high}$ | Downlink(DL) operating bandBS transmitUE receive $F_{DL\_low}$-$F_{DL\_high}$ | DuplexMode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2115 MHz | FDD |
| 5 | 824 MHz-849 MHz | 869 MHz-894 MHz | FDD |
| 6[Note 1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.4 MHz-1879.9 MHz | FDD |
| 10 | 1710 MHz-1770 MHz | 2110 MHz-2170 MHz | FDD |
| 11 | 1427.9 MHz-[1447.9] MHz | 1475.9 MHz-[1495.9] MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | [3410] MHz-[3500] MHz | [3510] MHz-[3600] MHz | FDD |
| ... | | | |
| 33 | 1900 MHz-1920 MHz | 1910 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| [41] | [3400] MHz-[3600] MHz | [3400] MHz-[3600] MHz | TDD |

[Note 1] Band 6 is not applicable

A single E-UTRA operating band can be used for both intra-band contiguous carrier aggregation and intra-band non-contiguous carrier aggregation. In the mean time, a plurality of E-UTRA operating bands can be used for inter-band non-contiguous carrier aggregation. Hereinafter, it is assumed that two E-UTRA operating bands are used to assist understanding of description. However, the two E-UTRA operating bands are only exemplary, and the present invention is not limited to the two E-UTRA operating bands.

Figure 7:
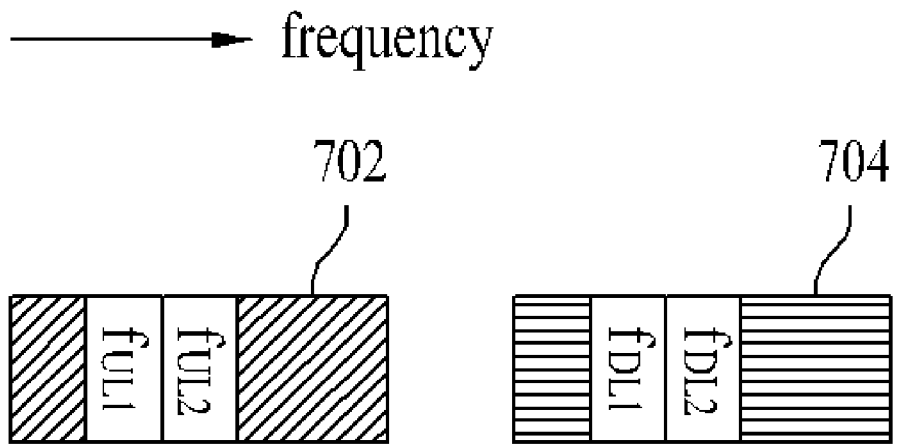
FIG. 7 to FIG. 9 are diagrams illustrating the relation of various carrier frequencies available under the carrier aggregation status.
Figure 8:
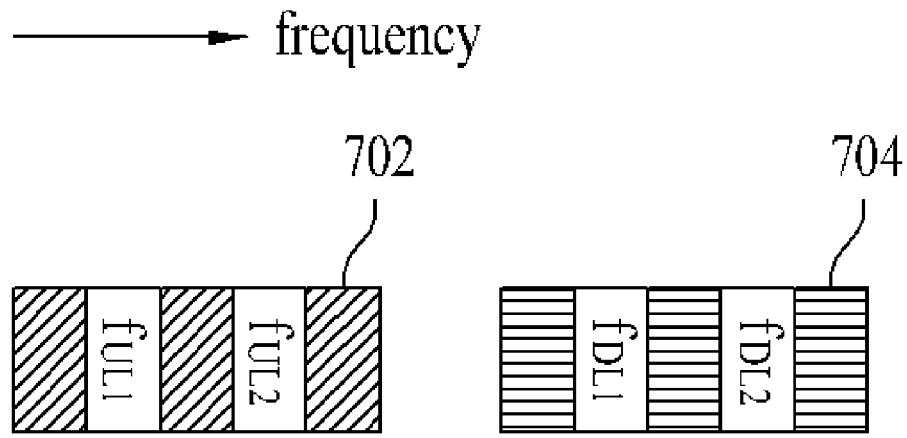
Figure 9:
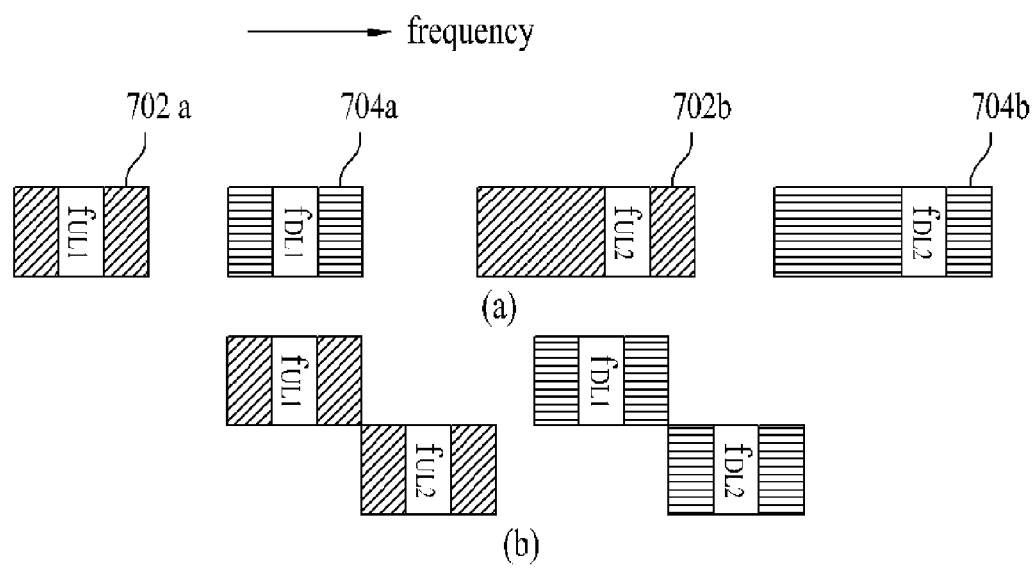

FIG. 7 to FIG. 9 illustrate location relation of a frequency band based on a type of CA. In FIG. 7 to FIG. 9, each box illustrates an operating band used for uplink transmission or downlink transmission (see E-UTRA operating band of Table 1). In FIG. 7 to FIG. 9, $f_{UL1}$ and $f_{DL1}$ represent an uplink carrier frequency and a downlink carrier frequency of the first component carrier (CC), respectively. Similarly, $f_{UL2}$ and $f_{DL2}$ represent an uplink carrier frequency and a downlink carrier frequency of the second component carrier (CC), respectively.

Referring to FIG. 7, a plurality of uplink carrier frequencies (for example, two uplink carrier frequencies) $f_{UL1}$ and $f_{UL2}$ adjoin each other within one operating band. Similarly, a plurality of downlink carrier frequencies (for example, two downlink carrier frequencies) $f_{DL1}$ and $f_{DL2}$ adjoin each other within one operating band. In other words, FIG. 7 illustrates intra-band contiguous carrier aggregation. Referring to FIG. 8, a plurality of uplink carrier frequencies (for example, two uplink carrier frequencies) $f_{UL1}$ and $f_{UL2}$ are away from each other within one operating band. Similarly, a plurality of downlink carrier frequencies (for example, two downlink carrier frequencies) $f_{DL1}$ and $f_{DL2}$ are away from each other within one operating band. In other words, FIG. 8 illustrates intra-band non-contiguous carrier aggregation. Referring to FIG. 9, a plurality of uplink carrier frequencies (for example, two uplink carrier frequencies) $f_{UL1}$ and $f_{UL2}$ exist in different operating bands 702a and 702b. The respective carrier frequencies can be allocated at the same time interval (a) or different time intervals (b). Similarly, a plurality of downlink carrier frequencies (for example, two downlink carrier frequencies) $f_{DL1}$ and $f_{DL2}$ exist in different operating bands 704a and 704b. In other words, FIG. 9 illustrates inter-band non-contiguous carrier aggregation.

FIG. 10 to FIG. 13 are diagrams illustrating an example of an RF architecture in an existing relay node and a method for transmitting a signal using the architecture. The RF architecture as shown has been used depending on the relay type (for example, type A or type B) illustrated in FIG. 1 and FIG. 2 and the CA type illustrated in FIG. 7 to FIG. 9. The RF architecture includes an RF transmit chain and an RF receive chain. The RF transmit chain includes a digital-to-analog converter (DAC), mixers 1002 to 1008 for frequency uplink conversion, a power amplifier (PA), a duplexer and a diplexer. The DAC converts a digital signal to an analog signal in a base band. The mixers 1002 to 1008 convert a base band signal to a band pass signal by multiplying the base band signal by carrier. The PA increases strength of the band pass signal. The duplexer serves as a filter that distinguishes an uplink signal from a downlink signal. The RF receive chain includes a diplexer, a duplexer, a low noise amplifier (LNA), mixers 1010 to 1016 for frequency downlink conversion, and an analog-to-digital converter (ADC). The LNA amplifies strength of a radio signal attenuated during a transmission process. The mixers 1010 to 1016 convert a band pass signal to a base band signal by multiplying the band pass signal by carrier. The ADC converts an analog signal to a digital signal.

Figure 10:
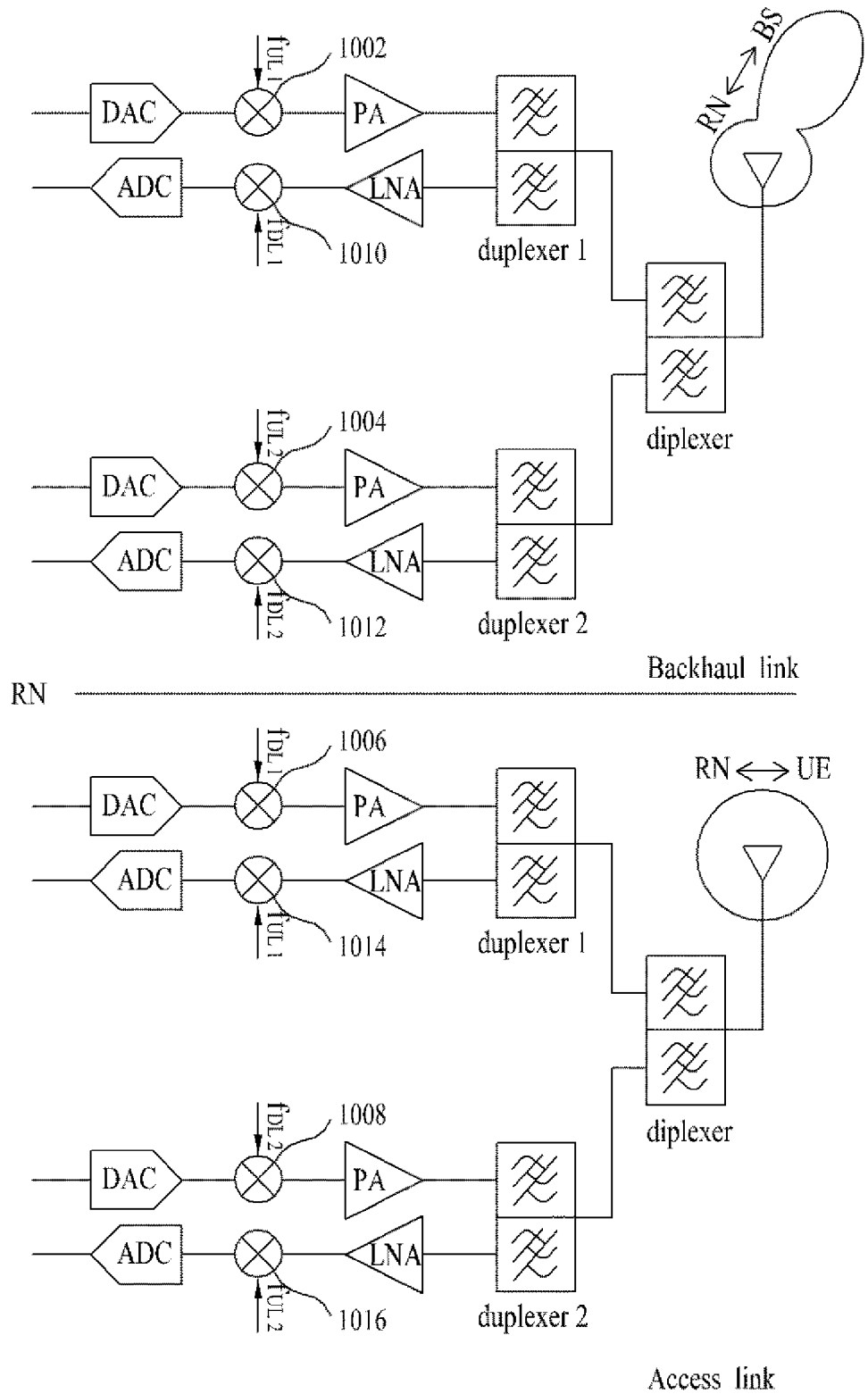
FIG. 10 and FIG. 11 are diagrams illustrating an example of an RF architecture in an existing relay node and a method for transmitting a signal using the architecture.
Figure 11:
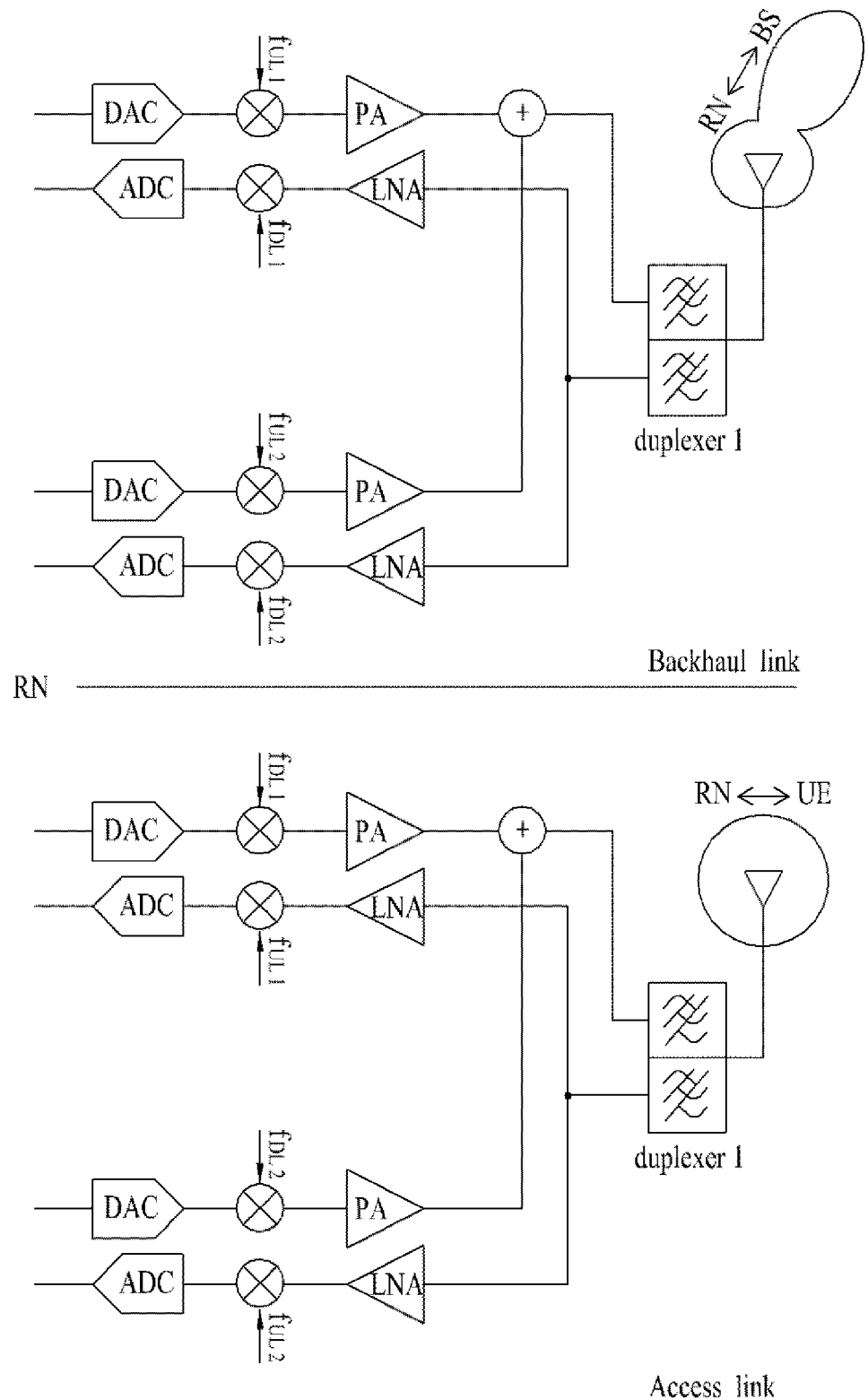

FIG. 10 and FIG. 11 illustrate an RF architecture of A type relay node (RN). The A type relay node is operated in both the backhaul link and the access link in accordance with the FDD mode. In the drawings, $f_{UL1}$ and $f_{DL1}$ represent an uplink carrier frequency and a downlink carrier frequency of the first component carrier (CC), respectively. Similarly, $f_{UL2}$ and $f_{DL2}$ represent an uplink carrier frequency and a downlink carrier frequency of the second component carrier (CC), respectively.

FIG. 10 illustrates that a plurality of CCs (for example, two CCs) exist in different operating bands (inter-band CA). Referring to FIG. 10, the relay node includes RF transmit/receive chains for each of carrier frequencies $f_{UL1}$, $f_{UL2}$, $f_{DL1}$, $f_{DL2}$. Also, the relay node further includes a duplexer to distinguish uplink carrier frequencies $f_{UL1}/f_{UL2}$ from downlink carrier frequencies $f_{DL1}/D_{L2}$ in the FDD mode. Also, the relay node further includes a diplexer to distinguish the respective operating bands from each other. The diplexer may be replaced with an antenna connected to the duplexer 1 and the duplexer 2, respectively.

FIG. 11 illustrates that a plurality of CCs (for example, two CCs) exist in the same operating band (intra-band CA). FIG. 11 is basically similar to FIG. 10. However, since a plurality of uplink/downlink carrier frequencies (for example, two uplink/downlink carrier frequencies) belong to the same operating band in FIG. 11, the relay node may not include a diplexer for distinguishing the operating bands from each other.

Figure 12:
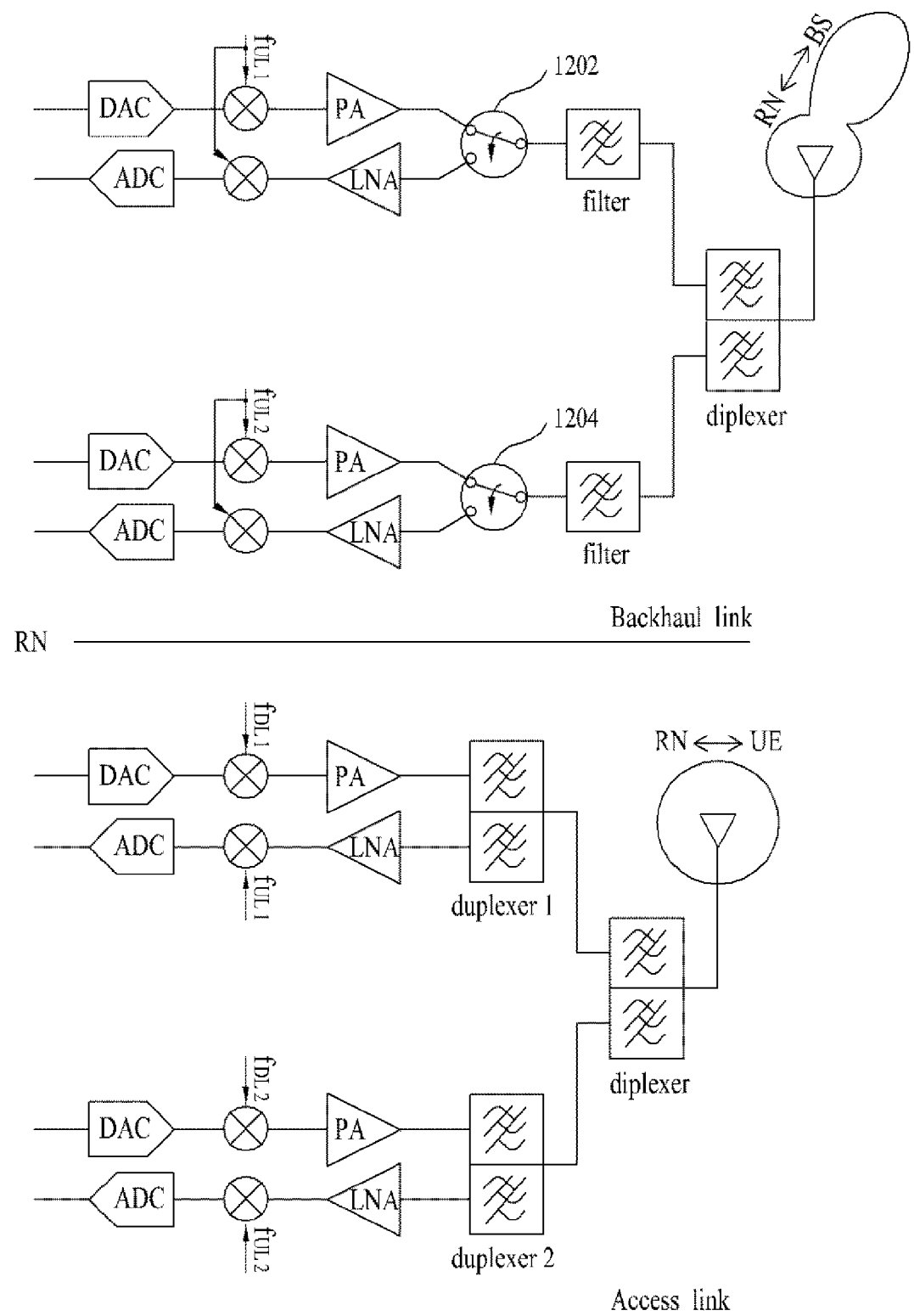
FIG. 12 and FIG. 13 are diagrams illustrating another example of an RF architecture in an existing relay node and a method for transmitting a signal using the architecture.
Figure 13:
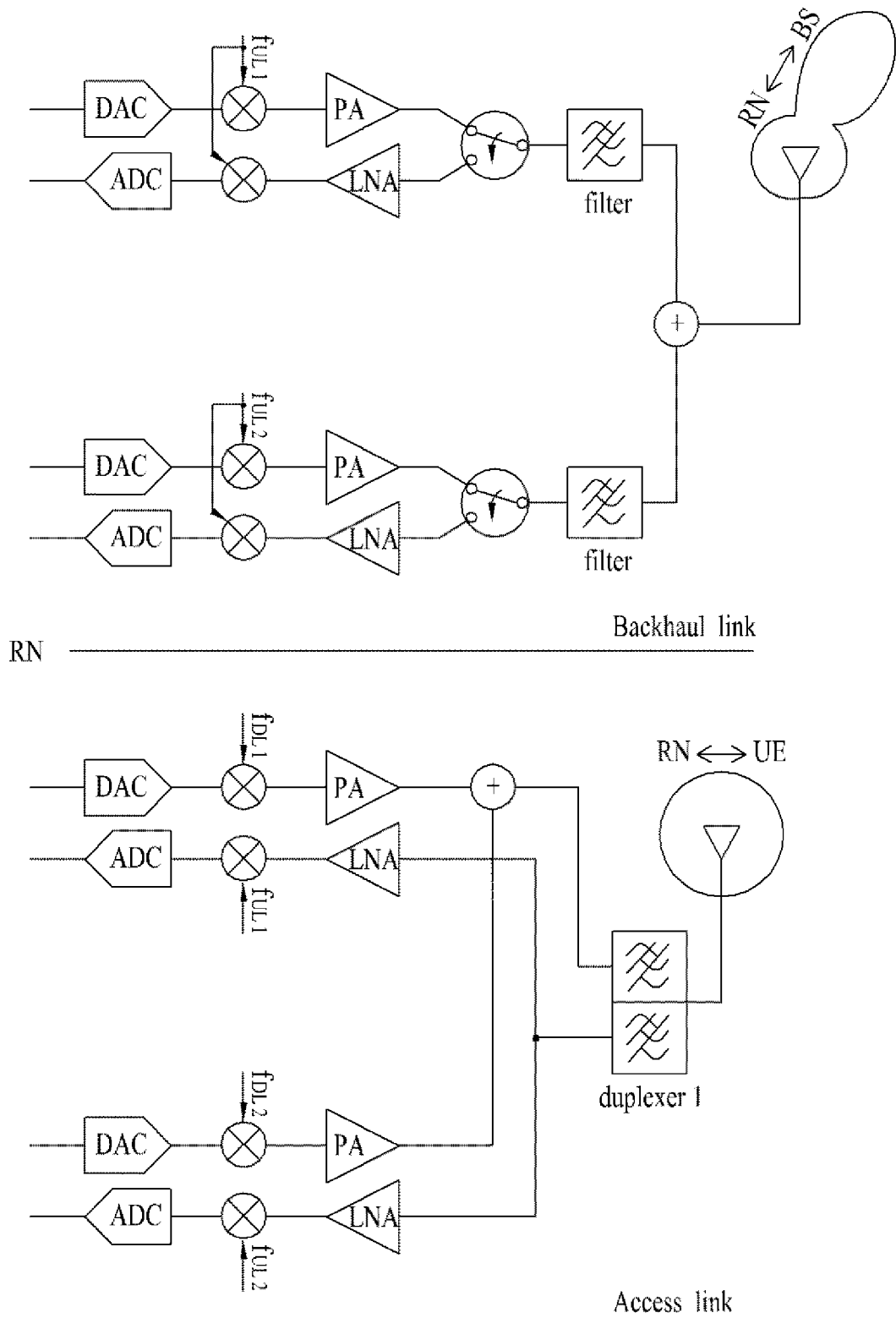

FIG. 12 and FIG. 13 illustrate an RF architecture of B type relay node (RN). The B type relay node is operated in the backhaul link in accordance with the TDD mode while it is operated in the access link in accordance with the FDD mode. In the drawings, $f_{UL1}$ and $f_{DL1}$ represent an uplink carrier frequency and a downlink carrier frequency of the first component carrier (CC), respectively. Similarly, $f_{UL2}$ and $f_{DL2}$ represent an uplink carrier frequency and a downlink carrier frequency of the second component carrier (CC), respectively.

FIG. 12 illustrates that a plurality of CCs (for example, two CCs) exist in different operating bands (inter-band CA). Referring to FIG. 12, since uplink carrier frequency is used for both the uplink and the downlink in the backhaul link (i.e., $f_{DL1\_BH}=f_{UL1\_BH}=f_{UL}$), the relay node includes switching unit 1202 and 1204 that switch an RF transmit chain and an RF receive chain depending on time, and a single band pass filter used in common for the RF transmit chain and the RF receive chain. Also, the RF architecture for the backhaul link includes RF transmit/receive chains for each CC. Since the respective belong to different operating bands, the relay node further includes a diplexer for distinguishing the respective operating bands from other. In the meantime, since the access link is operated in accordance with the FDD mode, the RF architecture for the access link is the same as that described with reference to FIG. 10. FIG. 13 illustrates that a plurality of CCs (for example, two CCs) exist in the same operating band (intra-band CA). FIG. 13 is basically similar to FIG. 12. However, since a plurality of CCs (for example, two CCs) belong to the same operating band in FIG. 13, the relay node may not include a diplexer for distinguishing the operating bands from each other. The diplexer may be replaced with an antenna connected to the duplexer 1 and the duplexer 2, respectively.

The RF architecture in the existing relay node, as described with reference to FIG. 10 to FIG. 13, include an RF transmit chain and an RF receive chain for each of the carriers. In other words, two RF chains exist for each of the carriers. Accordingly, if the number of carriers (for example, CCs) is increased, the number of required RF transmit/receive chains is increased linearly. Increase of the RF transmit/receive chains could lead to increase of RF components (for example, PA, LNA, duplexer, and diplexer). This may increase the production cost of the relay RF and hinder miniaturization of the relay RF.

In order to solve such problems, the present invention suggests that a plurality of RF transmit/receive chains transmit and receive signals by sharing at least a part of RF components (for example, PA, LNA, duplexer, diplexer, etc.) if the relay node includes the plurality of RF transmit/receive chains. In more detail, the present invention suggests a method for efficiently sharing RF components (for example, PA, LNA, duplexer, diplexer, etc.) in a relay node and a detailed RF architecture for the method. As RF chains share at least a part of RF components depending on a communication status, power control of the relay node can be performed efficiently. Also, the production cost of the relay RF can be reduced and the relay RF can be miniaturized.

Hereinafter, a method for performing communication by sharing RF components in a relay node will be described in more detail with reference to the drawings. Referring to FIG. 4 and FIG. 5 again, except that simultaneous transmission and simultaneous reception are performed in the relay node as illustrated in ①/②, it is possible to transmit and receive signals by sharing RF components between different RF transmit/receive chains. For example, if the RF transmit/receive chains of the relay node correspond to ③,④,⑤,⑥,⑦,⑧ of FIG. 4 in the A type relay node (i.e., FDD backhaul, FDD access), they can share at least the PA and the LNA. Similarly, if the RF transmit/receive chains of the relay node correspond to ③,④,⑤,⑥,⑧,⑨ of FIG. 5 in the B type relay node (i.e., TDD backhaul, FDD access), they can share at least the PA and the LNA.

Sharing of RF components between the RF transmit/receive chains in the relay node can be designed in various manners depending on signal configuration of transmitting and receiving signals. In this case, signal configuration includes, but not limited to, signal transmission direction (for example, uplink, downlink, backhaul link, and access link), carrier frequency (for example, CC) through which signal is transmitted, duplex mode (for example, FDD, TDD), CA type, and the frequency distance (for example, distance within (operating) band and distance between (operating) bands). Preferably, signal configuration includes CA type and the frequency distance (for example, distance within (operating) band and distance between (operating) bands).

Figure 14:
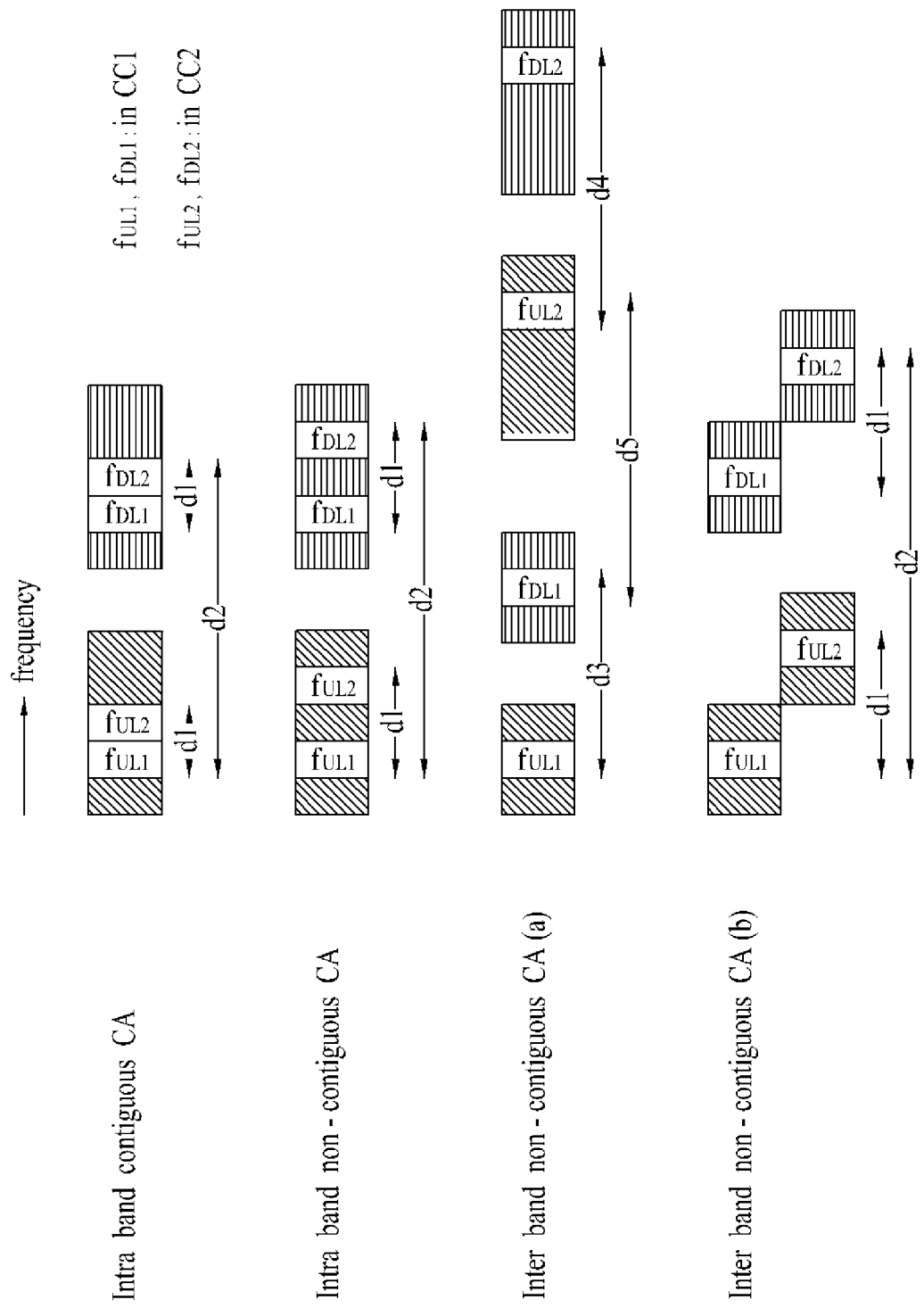
FIG. 14 is a diagram illustrating an example of analysis of a frequency distance between transmitting signals to efficiently perform power control in accordance with one embodiment of the present invention.

FIG. 14 is a diagram illustrating an example of analysis of a frequency distance between transmitting signals to design a relay RF architecture in accordance with one embodiment of the present invention. In FIG. 14, each box represents an operating band used for uplink transmission or downlink transmission (see E-UTRA operating band of Table 1). For understanding, it is assumed that two CCs (CC1 and CC2) exist in FIG. 14. However, the two CCs illustrated in FIG. 14 are only exemplary, and analysis of the frequency distance illustrated in FIG. 14 can similarly be applied to three or more CCs. $f_{UL1}$ means an uplink carrier frequency of CC1, and $f_{DL1}$ means a downlink carrier frequency of CC1. $f_{UL2}$ means an uplink carrier frequency of CC2, and $f_{DL2}$ means a downlink carrier frequency of CC2.

In this case, the frequency distance between transmitting/receiving signals can be defined as follows:

d1: distance ($f_{UL1}$~$f_{UL2}$) between the left end of an uplink channel bandwidth of CC1 and the right end of an uplink channel bandwidth of CC2 or distance ($f_{DL1}$~$f_{DL2}$) between the left end of a downlink channel bandwidth of CC1 and the right end of a downlink channel bandwidth of CC2;

d2: distance ($f_{UL1}$~$f_{DL2}$) between the left end of the uplink channel bandwidth of CC1 and the right end of the downlink channel bandwidth of CC2;

d3: distance between the uplink carrier frequency and the downlink carrier frequency within CC1, i.e., distance ($f_{UL1}$~$f_{DL1}$) between the left end of the uplink channel bandwidth and the right end of the downlink channel bandwidth within CC1;

d4: distance between the uplink carrier frequency and the downlink carrier frequency within CC2, i.e., distance ($f_{UL2}$~$f_{DL2}$) between the left end of the uplink channel bandwidth and the right end of the downlink channel bandwidth within CC2; and d5: distance ($f_{DL1}$~$f_{UL2}$) between the left end of the downlink channel bandwidth of CC1 and the right end of the uplink channel bandwidth of CC2.

Hereinafter, sharing of relay RF components considering transmission scenarios will be described in more detail with reference to FIG. 15 to FIG. 18. For understanding, it is assumed that two CCs (CC1 and CC2) exist in FIG. 15 to FIG. 18. However, the two CCs illustrated in FIG. 15 to FIG. 18 are only exemplary, and the present invention is not limited to the examples of FIG. 15 to FIG. 18. In FIG. 15 to FIG. 18, $f_{UL1}$ means an uplink carrier frequency of CC1, and $f_{DL1}$ means a downlink carrier frequency of CC1. $f_{UL2}$ means an uplink carrier frequency of CC2, and $f_{DL2}$ means a downlink carrier frequency of CC2. Accordingly, in CC1, $f_{UL1}$ is used to allow the relay node to receive a signal from the user equipment through the access link or transmit the signal to the base station through the backhaul link. Similarly, in CC1, $f_{DL1}$ is used to allow the relay node to transmit a signal to the user equipment through the access link or receive the signal from the base station through the backhaul link. $f_{UL2}$ and $f_{DL2}$ are used similarly. In FIG. 15 to FIG. 18, the following terminologies are used.

BH_tx_CC1: represents backhaul link transmission in CC1.
BH_rx_CC1: represents backhaul link reception in CC1.
AC_tx_CC1: represents access link transmission in CC1.
AC_rx_CC1: represents access link reception in CC1.
BH_tx_CC2: represents backhaul link transmission in CC2.
BH_rx_CC2: represents backhaul link reception in CC2.
AC_tx_CC2: represents access link transmission in CC2.
AC_rx_CC2: represents access link reception in CC2.

Figure 15:
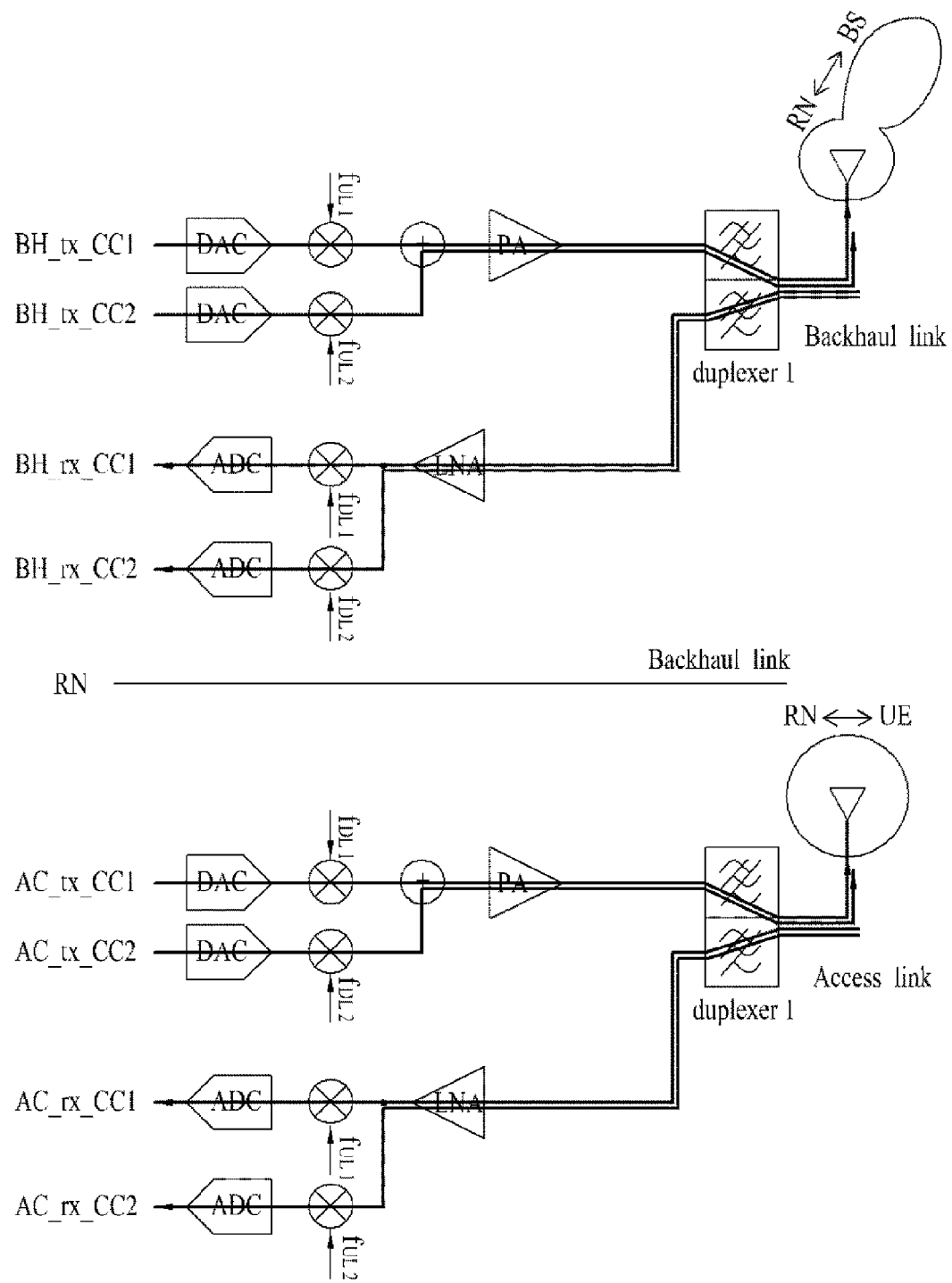
FIG. 15 is a diagram illustrating an RF architecture and a method for transmitting a signal using the architecture in accordance with one embodiment of the present invention.

FIG. 15 is a diagram illustrating an RF architecture and a method for transmitting a signal using the architecture in accordance with one embodiment of the present invention. In this embodiment, RF components are shared in the intra-band CA illustrated in FIG. 14. In case of intra-band CA, since downlink carrier frequencies or uplink carrier frequencies in different CCs exist in the same operating band, the RF transmit/receive chains related to carrier frequencies belonging to the same operating band can share at least the PA or LNA. Referring to FIG. 15, as compared with the RF architecture of FIG. 11, it is noted that a plurality of RF transmit chains share the PA and a plurality of RF receive chains share the LNA. In more detail, in the backhaul link, BH_tx_CC1 and BH_tx_CC2 share the PA, and BH_rx_CC1 and BH_rx_CC2 share the LNA. Similarly, in the access link, AC_tx_CC1 and AC_tx_CC2 share the PA, and AC_rx_CC1 and AC_rx_CC2 share the LNA.

Figure 16:
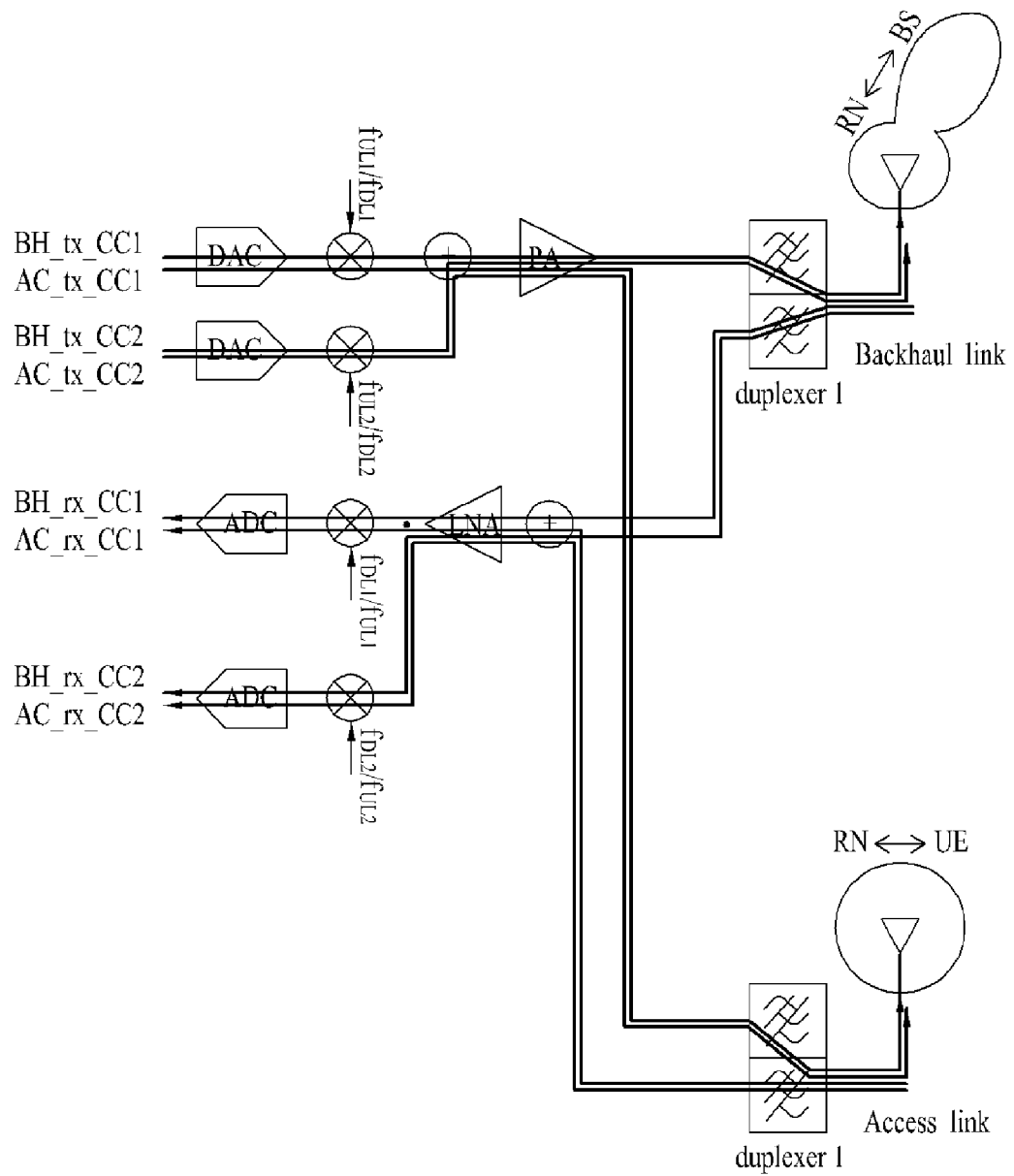
FIG. 16 is a diagram illustrating an RF architecture and a method for transmitting a signal using the architecture in accordance with another embodiment of the present invention.

FIG. 16 is a diagram illustrating an RF architecture and a method for transmitting a signal using the architecture in accordance with another embodiment of the present invention. This embodiment suggests another example that RF components are shared in the intra-band CA illustrated in FIG. 14. In case of ③,④,⑤,⑥,⑦,⑧ of FIG. 4 or ③,④,⑤,⑥,⑧,⑨ of FIG. 5, the relay node does not transmit or receive a signal to and from the base station and the user equipment at the same time. In other words, the backhaul link and the access link are divided from each other in accordance with the TDM mode in the time domain, and the relay node performs communication by using either the backhaul link or the access link at a random time. Accordingly, it is possible to share the RF transmit/receive chains for the backhaul link and the RF transmit/receive chains for the access link in the relay RF architecture of FIG. 15. However, since the carrier frequency f, used for backhaul link transmission is different from the carrier frequency $f_{DL}$ used for access link transmission, the frequencies of the carriers used for frequency unlink conversion should dynamically be switched depending on the transmission timing point $[f_{UL1}(BH\_tx\_CC1) \leftrightarrows f_{DL1}(AC\_tx\_CC1)$ 그는 $f_{UL2}(BH\_tx\_CC2) \leftrightarrows f_{DL2}(AC\_tx\_CC2)]$. Similarly, since the carrier frequency $f_{DL}$ used for backhaul link reception is different from the carrier frequency $f_{UL}$ used for access link reception, the frequencies of the carriers used for frequency downlink conversion should dynamically be switched depending on the transmission timing point $[f_{DL1}(BH\_rx\_CC1) \leftrightarrows f_{UL1}(AC\_rx\_CC1)$ 그는 $f_{DL2}(BH\_rx\_CC2) \leftrightarrows f_{UL2}(AC\_rx\_CC2)]$.

Figure 17:
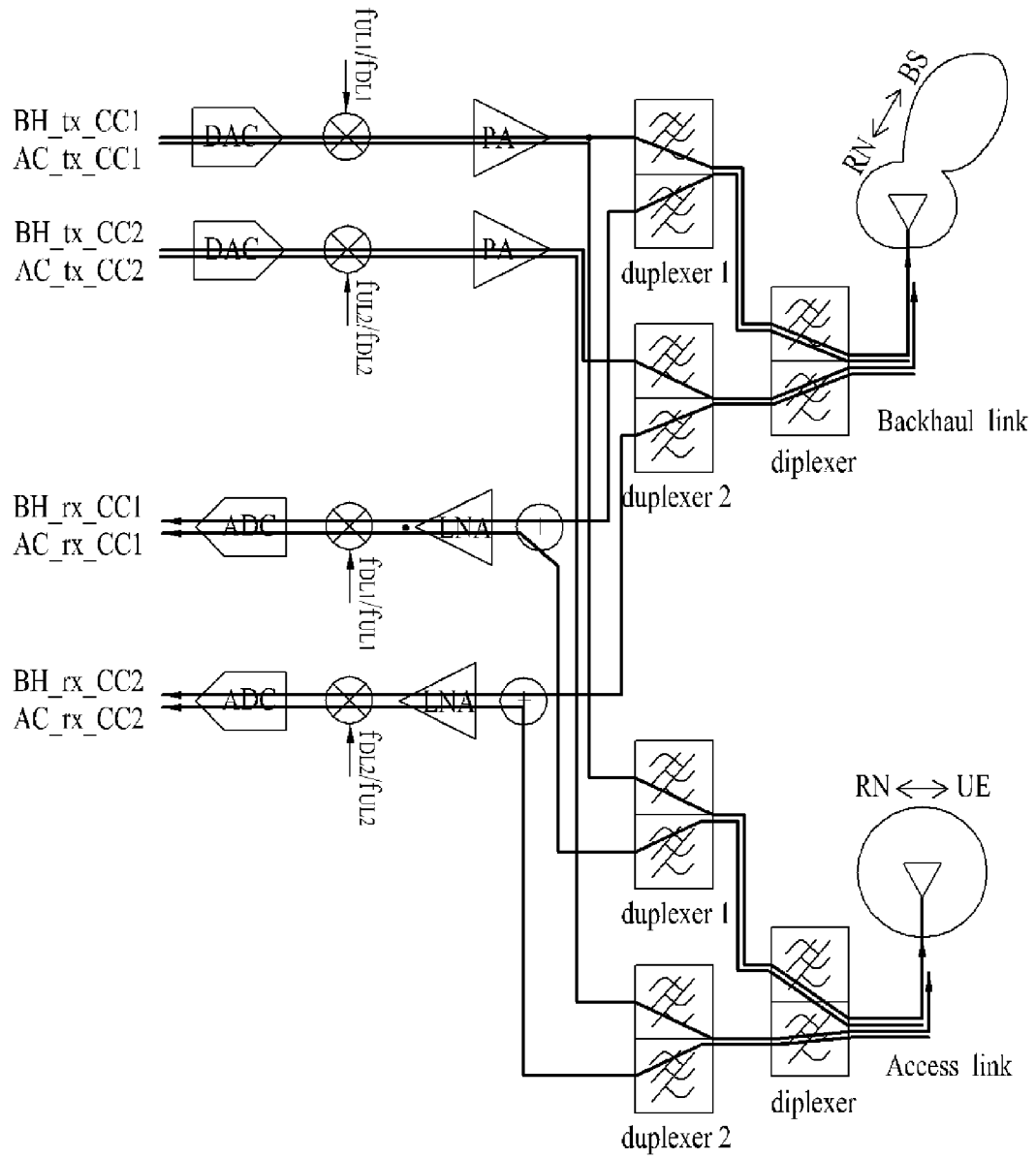
FIG. 17 is a diagram illustrating an RF architecture and a method for transmitting a signal using the architecture in accordance with still another embodiment of the present invention.

FIG. 17 is a diagram illustrating an RF architecture and a method for transmitting a signal using the architecture in accordance with still another embodiment of the present invention. This embodiment suggests an example that RF components are shared in the inter-band non-contiguous CA illustrated in FIG. 14. The RF architecture of FIG. 17 is basically similar to that of FIG. 16. However, the RF architecture of FIG. 17 is based on the inter-band CA status, it further includes a diplexer (i.e., filter) for distinguishing their respective operating bands from each other, as compared with the RF architecture of FIG. 16. The diplexer may be replaced with an antenna connected to the duplexer 1 and the duplexer 2, respectively.

Figure 18:
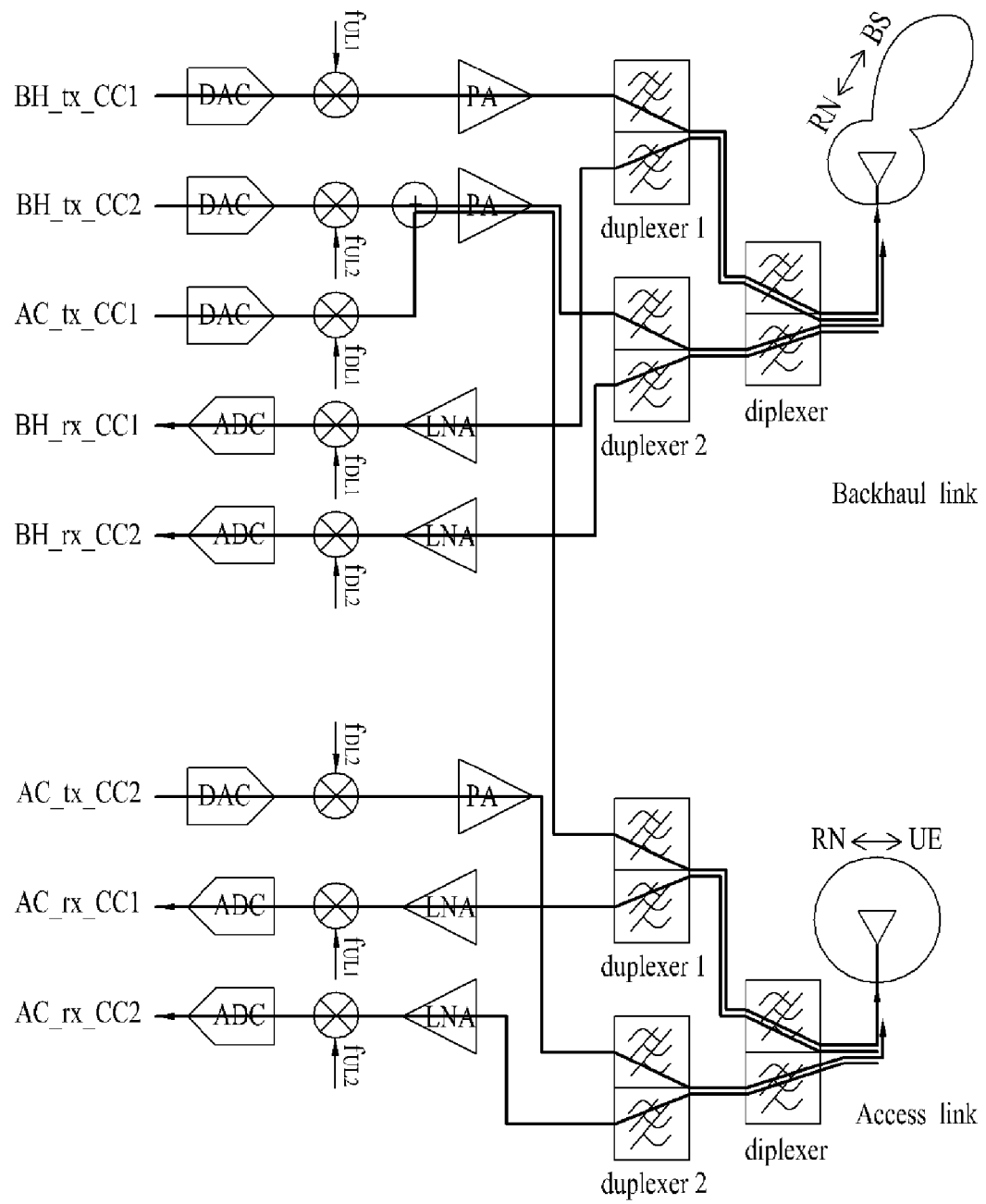
FIG. 18 is a diagram illustrating an RF architecture and a method for transmitting a signal using the architecture in accordance with further still another embodiment of the present invention.

FIG. 18 is a diagram illustrating an RF architecture and a method for transmitting a signal using the architecture in accordance with further still another embodiment of the present invention. This embodiment suggests an example that RF components are shared in the inter-band non-contiguous CA, especially inter-band non-contiguous CA status (a) illustrated in FIG. 14. The RF architecture of FIG. 18 is basically similar to that of FIG. 10. However, the RF architecture of FIG. 18 shares the PA between the RF transmit chains that use carrier frequencies $f_{DL1}$ and $f_{UL2}$ corresponding to d5 of FIG. 14. Referring to FIG. 18, the RF transmit chain BH_tx_CC2 that uses $f_{UL2}$ in CC2 and the RF transmit chain AC_tx_CC1 that uses $f_{DL1}$ share the PA.

Figure 19:
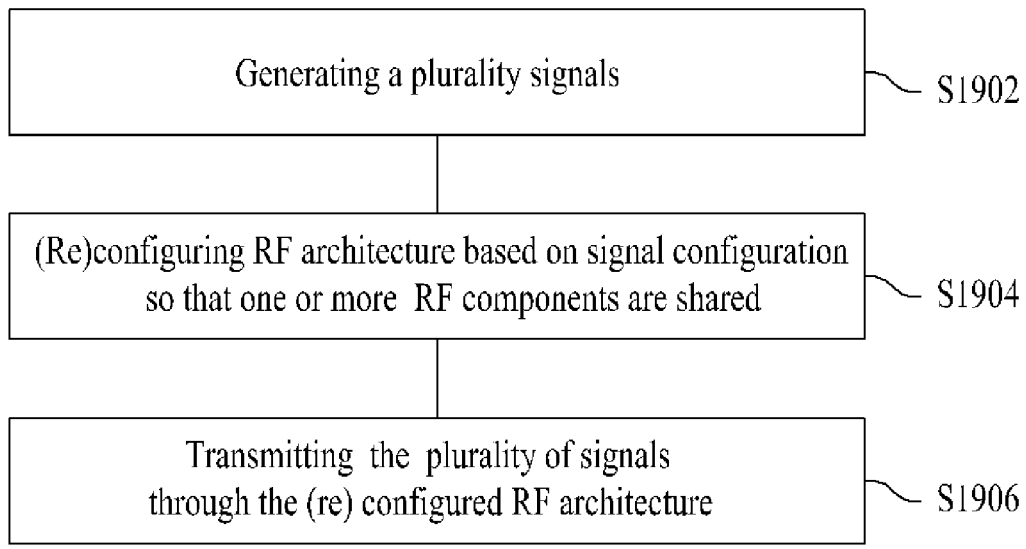
FIG. 19 is a flow chart illustrating an example of a method for efficiently managing a relay RF in accordance with one embodiment of the present invention.

FIG. 19 is a flow chart illustrating an example of a method for efficiently managing a relay RF in accordance with one embodiment of the present invention. Referring to FIG. 19, the relay node generates a plurality of signals (S1902). The plurality of signals include backhaul signals or access signals. The plurality of signals may be transmitted by using an OFDMA scheme and an SC-FDMA scheme. Like the 3GPP, the plurality of signals may be transmitted by using the OFDMA scheme in the downlink and the SC-FDMA scheme in the uplink. The relay node determines sharing of RF components depending on signal configuration of the plurality of signals, and (re)configures the RF architecture depending on the determined sharing (S1904). Signal configuration includes, but not limited to, signal transmission direction (for example, uplink, downlink, backhaul link, and access link), carrier frequency (for example, CC) through which signal is transmitted, duplex mode (for example, FDD, TDD), CA type, and the frequency distance (for example, distance within (operating) band and distance between (operating) bands). Preferably, signal configuration includes CA type and the frequency distance (for example, distance within (operating) band and distance between (operating) bands). The RF components in the relay node can be shared between the RF transmit/receive chains by using, but not limited to, the methods illustrated in FIG. 15 to FIG. 18. Afterwards, the relay node transmits the plurality of signals to the base station and/or the user equipment by using the (re)configured RF architecture (S1906).

Table 2 illustrates the difference in the number of RF components between the RF architecture according to the related art illustrated in FIG. 10 to FIG. 13 and the RF architectures according to the embodiments of the present invention.

TABLE 2

|  | Related art | Embodiments of the present invention | | | |
| --- | --- | --- | --- | --- | --- |
|  | FIGS. 10~13 | FIG. 15 | FIG. 16 | FIG. 17 | FIG. 18 |
| # of PA | 4 | 2 | 1 | 2 | 3 |
| # of LNA | 4 | 2 | 1 | 2 | 4 |
| # of Mixer | 8 | 8 | 4 | 4 | 8 |

Referring to Table 2, in the four RF architectures according to the embodiment of the present invention, the number of PAs and LNAs is smaller than that in the RF architecture of the related art. In particular, in the RF architecture illustrated in FIG. 15, the number of required PAs and LNAs corresponds to ¼ of that in the RF architecture of the related art.

Figure 20:
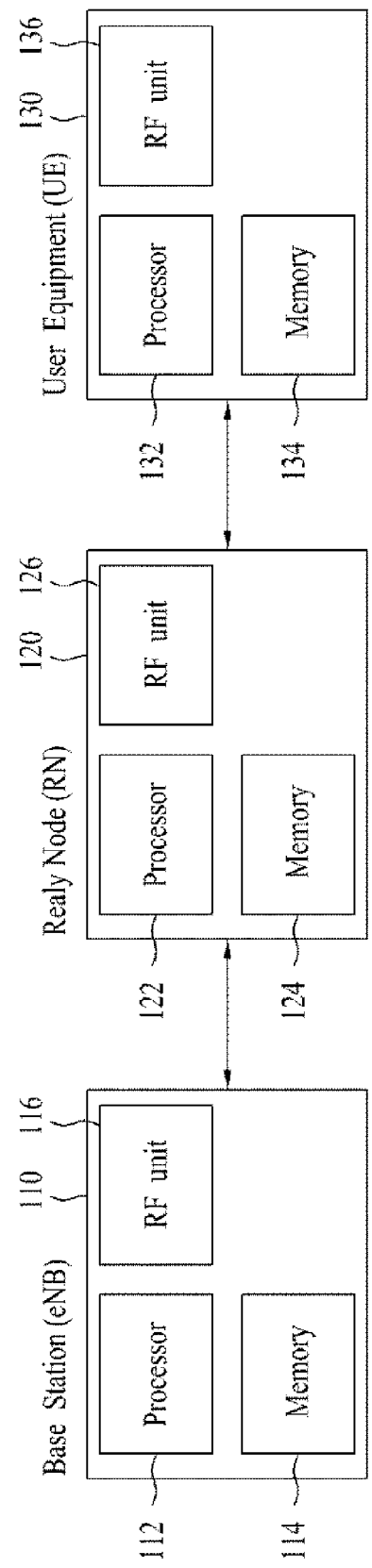
FIG. 20 is a diagram illustrating a base station, a relay node and a user equipment, which can be applied to the embodiment of the present invention.

FIG. 20 is a diagram illustrating a base station, a relay node and a user equipment, which can be applied to the embodiment of the present invention.

Referring to FIG. 20, the wireless communication system includes a base station (BS) 110, a relay node (RN) 120, and a user equipment (UE) 130. In the backhaul downlink, the transmitter is a part of the base station 110, and the receiver is a part of the relay node 120. In the backhaul uplink, the transmitter is a part of the relay node 120, and the receiver is a part of the base station 110. In the access downlink, the transmitter is a part of the base station 110 or the relay node 120, and the receiver is a part of the user equipment 130. In the access uplink, the transmitter is a part of the user equipment 130, and the receiver is a part of the base station 110 or the relay node 120. In case of the macro user equipment 130, the link is formed between the base station 110 and the user equipment 130. In case of the relay user equipment 130, the link is formed between the relay node 120 and the user equipment 130.

The base station 110 includes a processor 112, a memory 114, and a radio frequency (RF) unit 116. The memory 114 is connected with the processor 112 and stores various kinds of information related to the operation of the processor 112. The RF unit 116 is connected with the processor 112 and transmits and/or receives a radio signal. The relay node 120 includes a processor 122, a memory 124, and a radio frequency (RF) unit 126. The processor 122 can be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The user equipment 130 includes a processor 132, a memory 134, and a radio frequency (RF) unit 136. The processor 132 can be configured to implement procedures and/or methods suggested in the present invention. The memory 134 is connected with the processor 132 and stores various kinds of information related to the operation of the processor 132. The RF unit 136 is connected with the processor 132 and transmits and/or receives a radio signal. The base station 110, the relay node 120 and/or the user equipment 130 can have a single antenna or multiple antennas.

In the mean time, the relay node 120 can further include a control unit (not shown) that controls transmission and reception operations. The control unit may be provided separately, or may be included in the processor 122 or may be implemented in a function block of the processor 122. The control unit can convert carrier frequencies in the mixers as illustrated in FIG. 15 to FIG. 18 in accordance with signal configuration or transmission scenarios and appropriately switch a transmission path (PA-filter) and a reception path (LNA-filter). However, it is to be understood that functions of the control unit are not limited to the aforementioned functions. The RF components (for example, mixer, PA and LNA) can be shared through the control unit, whereby the number of required PAs and LNAs can be reduced.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wireless communication system. More specifically, the present invention relates to a relay RF architecture and a method for the same, and can be applied to a communication system that includes a relay node.

The invention claimed is:

1. A relay node supporting carrier aggregation (CA) comprising multiple component carriers (CCs), the relay node comprising:
   a first antenna for performing communication with a base station through a backhaul link;
   a plurality of backhaul link radio frequency (RF) chains connected with the first antenna, for transmitting and receiving a radio signal for backhaul link transmission;
   a second antenna for performing communication with a user equipment through an access link;
   a plurality of access link RF chains connected with the second antenna, for transmitting and receiving a radio signal for access link transmission; and
   a control unit controlling the plurality of backhaul link RF chains and the plurality of access link RF chains to share at least a part of RF components between the backhaul link RF chains and the access link RF chains,
   wherein RF chains for the multiple CCs are configured for each of the CCs, and a carrier frequency for the backhaul link and a carrier frequency for the access link are selectively applied to each of the RF chains for the multiple CCs depending on time, and
   wherein RF receive chains among the RF chains configured for each of the CCs share a single low noise amplifier (LNA).

2. The relay node as claimed in claim 1, wherein RF transmit chains among the RF chains configured for each of the CCs share a power amplifier (PA) for the backhaul link or the access link.

3. The relay node as claimed in claim 2, wherein the RF transmit chains among the RF chains configured for each of the CCs share a single PA.

4. The relay node as claimed in claim 1, wherein RF transmit chains for the backhaul link of a first CC and RF transmit chains for the access link of a second CC share a single PA.

* * * * *